B. STANLEY.
SIGNAL DEVICE FOR MOTOR VEHICLES.
APPLICATION FILED NOV. 20, 1920.
1,391,803.
Patented Sept. 27, 1921.
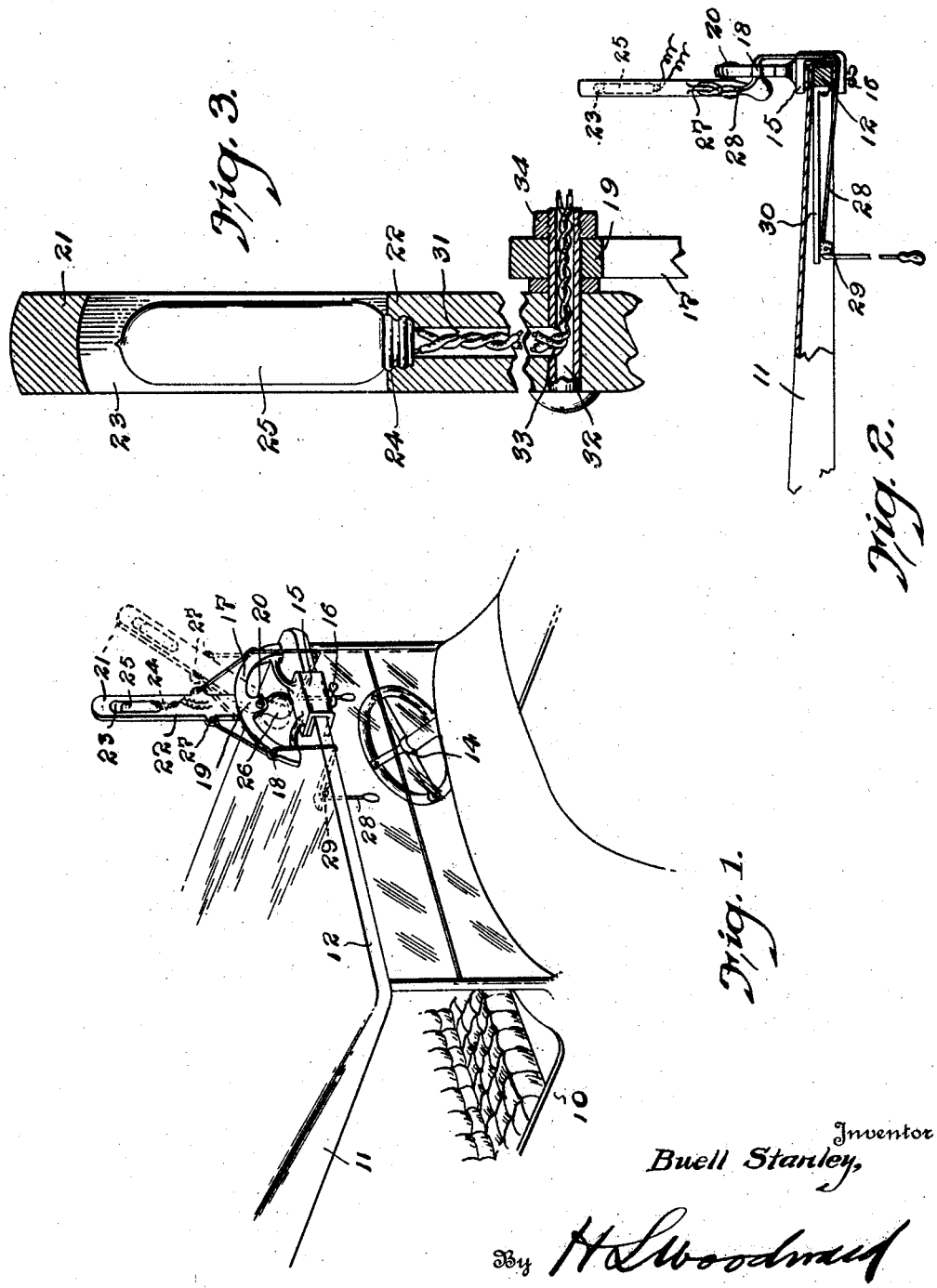
Inventor
Buell Stanley,
By H. L. Woodman
Attorney

UNITED STATES PATENT OFFICE.

BUELL STANLEY, OF WASHINGTON, DISTRICT OF COLUMBIA.

SIGNAL DEVICE FOR MOTOR-VEHICLES.

1,391,803.     Specification of Letters Patent.     Patented Sept. 27, 1921.

Application filed November 20, 1920. Serial No. 425,408.

*To all whom it may concern:*

Be it known that I, BUELL STANLEY, a citizen of the United States, residing at Washington, in the District of Columbia, have invented certain new and useful Improvements in Signal Devices for Motor-Vehicles, of which the following is a specification.

This invention relates to signaling devices, and more particularly to that type in which the proposed course of a vehicle carrying such signal may be indicated. It is an aim to provide such a signal readily observable from both the front and rear of the vehicle upon which it may be mounted.

When a turn is contemplated at present, in the absence of a signaling device, it is customary for many drivers of vehicles to give the same motion with the hand to indicate a turn in either direction, which, in a congested street or crossing, is confusing and often results in accidents, due to a wrong interpretation of the drivers' signals.

It is therefore an object of my invention to provide a device of a character which will be positive in its operation and of such construction as to eliminate any doubt as to the direction a driver contemplates taking. A further object is to provide a means whereby the operating devices of the signal may be mounted within ready reach of an operator of a motor vehicle. A still further object is the utilization of a light of such shape that drivers of vehicles in the rear and those in front may know at a glance the proposed path of the vehicle bearing such signal, without requiring the reading of any lettering of the distinguishing of details of pointers.

Additional objects, advantages and features of invention may appear from the following description and drawings, wherein, Figure 1 is a fragmentary perspective view of an automobile equipped with my invention, Fig. 2 is a fragmentary sectional view thereof, showing the manner of mounting my signal device, Fig. 3 is a detail longitudinal sectional view of the indicator and its mounting.

There is illustrated a motor vehicle 10, equipped with the usual top 11 employing a front bow 12, from which the usual top material is stretched and secured. Upon this bow 12 and over the top covering material (which is not disturbed), there is mounted, directly in front of the steering wheel 14, a clamp bracket 15, U-shaped in cross section, and of a size to be readily slipped over the bow 12, and secured, finally, in its position upon the bow, by means of a clamping screw 16. Upon the upper side of the bracket 15 there is formed a segment 17 to lie in a vertical plane with the bow 12, and which may be formed integrally with the bracket, as shown, or separately, as found desirable. At suitable distances from the vertical middle plane of the segment 17, eyelets 18 are formed upon the segment, the purpose of which will be described later. An aperture is provided through an enlarged portion 19 upon the segment 17, through which a bolt 20 is extended secured in a counterbalanced indicator 21; the indicator being secured to the segment or support for oscillation in a lateral direction. The indicator is preferably made of metal, and at the upper end of the arm 22 an elongated longitudinal slot 23 is provided, in the lower end of which there may be mounted a socket receptacle 24 or other fastening means for an electric light bulb 25 of similar shape to that of the slot. The lamp may derive its current from any suitable source, such as, for instance, the usual storage battery of a car. The lower part 26 of the indicator is made of sufficient weight to counter-balance the upper part, or that part above the bolt 20. Intermediately of the indicator 21 ears 27 are formed to which operating cords 28 are attached, the cords then being threaded through the eyelets 18, and downwardly beneath the lower part of the bow 12 of the top and over small pulleys 29 mounted upon horizontal support arms 30 secured to the back of the bow 12. The lower ends of the operating cords are provided with suitable hand-holds or knobs to facilitate the operation of the signal, as desired.

In Fig. 3, I have illustrated one method of running wires from the bracket to the socket 24 in the indicator. In this form, the support or segment may be identical in construction to that previously shown and described, and the outward appearance of the indicator is the same, but through the vertical axis of the indicator a hole 31 is formed, beginning at the lower end of the elongated slot 23 and ending at the horizontal hole drilled for the pivot bolt of the indicator. The pivot bolt 32 in this case is hollow through out its length, and a circumferential slot 33 is formed therein, so as to register with the hole 26 of the indicator. The indicator being put in place upon the support by means of the bolt 32 and nut 34, the electric wiring may be inserted through the hole 31 from the upper part thereof downwardly through the slot 33, and thence outwardly through the bolt 32 to a suitable current source. It will be readily seen that by reason of the slot 33, the indicator will have free lateral movement, and the wires running through the bolt 32 may undergo, without damage, the slight twisting and untwisting movements involved by action of the signal.

It is a matter of common knowledge among motorists that at night on suburban roads, the outlines of vehicles at a distance cannot be determined, and the position of a tail-light or other lights with respect to the body of the vehicle cannot be discerned. If an ordinary light were utilized in my signal arm, when in use, a following vehicle would not be able to determine whether the arm is vertical, inclined to the right or inclined to the left. But, by utilizing a light with the elongated field, when the device is operated for a right-hand turn, a following vehicle will see in the distance an elongated luminous object with an inclination from its lower end toward the right, and its significance cannot be mistaken. The same applies to its use for indicating left hand turns or a straight course. Also, in case a vehicle is being operated without headlights or side-lights at the front, it is not necessary for an observer to know whether the vehicle carrying the signal is approaching or departing, in order to determine the relation of its course to that of the observer. In other words, when the light is shown in an inclined position, the observer can determine from the inclination and position with respect to his own car whether it will cross his path whether going or coming. This effect of the light is illustrated in Fig. 4, where the light only is shown, standing out from a dark background, which may or may not include the vehicle, and represents the condition of a dark road, when my device is in use.

What is claimed is:

1. In a device of the character described the combination of a vehicle top front ledge, a clamp support engaged thereon, a direction indicator on the support movable in a vertical plane transverse to the vehicle, said indicator being so positioned on the bracket as to set over the top, and operating means for the indicator.

2. In a device of the character described the combination of a vehicle top, a clamp bracket construction to engage the front transverse edge of the vehicle top, an oscillating signal arm thereon adjusted to be viewed from front and rear above the top of the vehicle upon which it is mounted and positioned on said bracket to lie in a vertical plane rearwardly of the said edge of the top and operating means for the arm.

In testimony whereof I have affixed my signature.

BUELL STANLEY.